United States Patent [19]

Sarmiento et al.

[11] Patent Number: 4,784,674
[45] Date of Patent: Nov. 15, 1988

[54] MIST ELIMINATOR MODULE AND A METHOD FOR SELF-CLEANING OF THE SAME

[75] Inventors: Otto Sarmiento, Darien; Even Bakke, Stamford, both of Conn.

[73] Assignee: Flakt, Inc., Atlanta, Ga.

[21] Appl. No.: 82,053

[22] Filed: Aug. 5, 1987

[51] Int. Cl.$^4$ ............................................. B01D 46/04
[52] U.S. Cl. ........................................ 55/96; 55/440; 55/257.2
[58] Field of Search ................... 55/96, 440, 442, 446, 55/257 PV

[56] References Cited

U.S. PATENT DOCUMENTS

| | | | |
|---|---|---|---|
| 2,752,005 | 6/1956 | Avera et al. | 55/440 |
| 2,925,878 | 2/1960 | Spann | 55/185 |
| 3,276,193 | 10/1966 | Lamb | 55/440 |
| 3,517,486 | 6/1970 | Golden | 55/257 PV X |
| 3,811,252 | 5/1974 | Evans et al. | 55/228 |
| 3,864,110 | 2/1975 | Wyman et al. | 55/440 |
| 3,870,488 | 3/1975 | Ardnt et al. | 55/440 |
| 3,964,883 | 6/1976 | Nakao | 55/96 |
| 4,053,292 | 10/1977 | Schneider et al. | 55/227 |
| 4,157,250 | 6/1979 | Regehr | 55/257 PV X |
| 4,251,242 | 2/1981 | Ito | 55/242 |
| 4,322,234 | 3/1987 | Mock | 55/440 |

FOREIGN PATENT DOCUMENTS 0148657 10/1952 Australia ........................... 55/440
0222385 10/1924 United Kingdom ................. 55/440

OTHER PUBLICATIONS

Southern Plastics Company "Soplasco Eliminator Blades", SP-009 and SP-010, received Group 180 5-2-5-64.

Primary Examiner—Charles Hart
Attorney, Agent, or Firm—St. Onge Steward Johnston & Reens

[57] ABSTRACT

A mist eliminator module, comprising a plurality of smooth parallel mist eliminator blades, preferably formed from a fiber reinforced polymeric material is disclosed. Each blade has in a captive edge portion at least one aperture, which is aligned with apertures in adjacent blades. At least one support rod extends through the apertures, with a plurality of resilient tubular spacers fitted onto the rod between the blades. At least one rigid spacer bar, having a plurality of slots in one face for receiving the free blade edge portions is attached to the other blade edges. A water spray may be directed onto the blades to form a film of water on the blades. The blades may be cleaned in place by removing the spacer bar and separating each blade from an adjacent blade, and manually cleaning each side of each blade. The blades may also be cleaned by operating the tower with the water spray running and the support bar removed so that the blades flex sufficiently to flake off any accumulated solids.

22 Claims, 3 Drawing Sheets

MIST ELIMINATOR MODULE AND A METHOD FOR SELF-CLEANING OF THE SAME

FIELD OF THE INVENTION

The present invention relates to mist eliminator systems used in flue gas desulfurization exhaust streams and other gas streams having particulates and droplets which would tend to clog or scale the blades of a mist eliminator system.

A mist eliminator, also known as a droplet collector, is used to remove suspended liquids or droplets from a gas stream. Typically, one or more mist eliminator modules or sections are installed in a vertical droplet scrubbing tower or in a horizontal scrubber casing. A mist eliminator module is usually a group of closely spaced parallel zig-zag eliminator blades fastened together. Liquid droplets impinge on and are deposited on the blades and thereby removed from the gas stream.

In heavy duty applications, such as the exhaust stream from a flue gas desulfurization unit (such units are frequently used to treat the exhaust of coal fired boilers and paper mill exhaust fumes), the gas stream may contain solid particulates and/or liquid droplets that react with gaseous components in the gas stream to precipitate solids. For example, the exhaust stream of a flue gas desulfurization unit may contain droplets to a slurry of water and calcium salts which will react with residual sulfur dioxide in the gas stream to precipitate calcium sulfite or calcium sulfate on the mist eliminator blades. These deposited solids (usually referred to as "scale") reduce the mist eliminator droplet removal efficiency and eventually clog the passages between the blades.

It is desirable therefore to provide for a mist eliminator module that is easily cleaned, or, preferably, self cleaning, to prevent the formation of scale on the blades by the precipitation and build-up of solids.

BACKGROUND ART

Several designs have been proposed to allow for the periodic cleaning of mist eliminator blades (also referred to in the art as plates). One such design, in the U.S. Pat. No. 2,752,005 to Avera for an Eliminator Plate Assembly for Air Washers discloses a clip at one end of each plate, which is hooked over a bar so that the plate hangs from the bar and swings freely so that a plate may be easily spread apart from an adjacent plate. At the other end of the plate a slotted spacer bar holds the other ends of the plates in position, but can be detached for cleaning of the plates.

It has been found in actual use with the exhaust streams of desulfurization units that structures such as that used by Avera U.S. Pat. No. 2,752,005 quickly become clogged, rendering the mist eliminator unit ineffective. In particular, the hooked ends quickly accumulate solids and scale. Therefore, the assembly shown in Avera U.S. Pat. No. 2,752,005 will have an excessive amount of cleaning downtime. Furthermore, due to the nature of the clip and bar combination used to provide a pivot, the invention shown in Avera is difficult to use when inverted, that is, when the pivot end of the plates is located on the bottom side of the plates. In such an orientation the plates are difficult to realign after cleaning so that the spacer bar is fitted onto the free ends of the plates.

U.S. Pat. No. 3,276,193 to Lamb for an Eliminator Plate Assembly for Air Washers discloses an assembly in which the hooked ends of plates are fitted into matching hooks of a core framework.

The Lamp U.S. Pat. No. 3,276,193 invention has also been found to be subject to excessive clogging of the blades in heavy duty applications. The hooked ends of the blades and their mountings quickly accumulate precipitated solids and scale during use, creating the need for frequent cleaning. Furthermore, it has been found that when structures such as that disclosed by Lamb U.S. Pat. No. 3,276,193 are used in a vertical gaseous flow environment such as in a tower, that droplets removed from the gas stream will collect in the hooked ends of the blades, and this collected liquid will be reentrained in the gas stream.

U.S. Pat. No. 3,864,110 to Wyman for a Support Assembly For Eliminator Blades discloses an assembly in which the edges of blades are seated in grooves formed in support bars situated at the top, bottom, and lateral edges of each blade. However, no provision is made in this design for separating individual blades like the pages of a book to clean them.

U.S. Pat. No. 3,870,488 to Arndt for a Liquid Eliminator discloses fitting the hooked ends of a blade into a slotted support bracket. The structure disclosed in Arndt has been found to be extremely prone to clogging and solids accumulation in heavy duty use. The hooked ends of the blades and their supports quickly accumulate both liquids and solids in heavy duty service. These accumulated solids and scale must be manually removed, and this may only be accomplished by a complete disassembly of the mist eliminator. Furthermore, if the invention of Arndt U.S. Pat. No. 3,870,488 is used in a vertical gaseous flow environment such as in a tower, the various trapping vanes and deflectors formed on the blades will fill with trapped droples leading to reentrainment of the droplets, giving a low droplet removal efficiency.

To reduce the problem of clogging by particulates, several inventors have suggested the use of an intermittent or continuous wash water spray on the eliminator blades. For example, in U.S. Pat. No. 4,053,292 to Schneider for a Gas Scrubbing Plant, an intermittent 10 second rinse cycle for each hour of operation is recommended to keep plates clean. U.S. Pat. No. 4,251,242 to Ito for a Mist Eliminator also discloses the use of a wash water spray.

The prior art thus has forcused on various blade holding frameworks which use a pivoting hook and rod combination to allow access to the plates for cleaning. This type of mounting has been found to be subject to rapid clogging and deteriorating efficiency in heavy duty applications, and has also been found to lead to reentrainment of collected liquid when used in a vertical flow tower. The prior art does not provide for a blade module which both obviates solid accumulation and which may be readily cleaned in place either manually or by a method of self-cleaning.

SUMMARY OF THE INVENTION

The present invention relates to a mist eliminator blade module which may be cleaned in place either manually or by a method of self cleaning.

The invention is a mist eliminator module, comprising a plurality of aligned smooth mist eliminator blades having no hooks or protrusions. Preferably, the blades are formed from a fiber reinforced polymeric material.

A support means resiliently holds a captive edge portion of the blades in spaced alignment.

Preferably the support means is at least one rod extending through aligned apertures in a captive edge portion of adjacent blades. A plurality of resilient spacers are located between the blades to allow the blades to be flexibly separated, and a holding means holds the rod, blades and spacers together.

A detachable spacer means holds a free edge portion of the blades in spaced alignment.

Preferably the spacer means is at least one rigid spacer bar, having a plurality of slots in one face, attached to the free edge portion of the blades by inserting the free edge portions into the spacer bar slots.

A water spray may be directed onto the blades to form a continuous film of water on the blades.

The blades may be manually cleaned in place by removing the spacer means and separating each blade from adjacent blades, and cleaning each side of the blade. The blade module may also be made self-cleaning by operating the mist eliminator chamber with the water spray running and the support bar removed so that the blades flex and vibrate sufficiently to flake off any accumulated solids.

BEST MODE OF THE INVENTION

Figure 1:
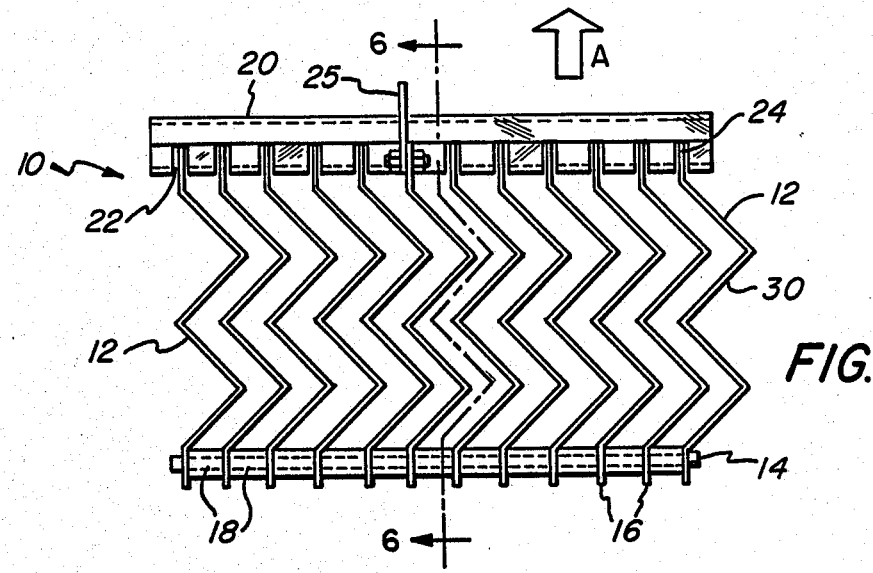
FIG. 1 is an end view of a mist eliminator module of the present invention.

In accordance with the invention, a mist eliminator module 10 is shown. The mist eliminator has a plurality of thin, smooth zig-zag mist eliminator blades 12 held parallel to each other and spaced sufficiently closely together that there are no straight line paths through the module in the direction of the gas flow shown by arrow A. This spacing insures that a gas stream passing through the mist eliminator module must change direction at least once in the module. The entrained liquid in the gas stream will impinge on and be caught by the blade surfaces. In the embodiment shown, the blades 12 are four bend blades. However, the present invention is applicable to two bend or three bend blades and other types of blades as well.

The blades 12 preferably comprise a fiberglass core covered with a thick polyester resin coating and a surfacing veil to insure a smooth resin-rich surface on each blade 12. However, the blades may be made of any other materials such as other polymeric compounds or metal. The smooth surface prevents the accumulation of solids in the pits and fissures of blade surfaces made from other types of materials or according to prior art designs.

The blades 12 are held together in the selected spacing by two supporting elements. The first element is a support means which resiliently holds a captive edge portion 16 of the blades 12 in spaced alignment. Preferably, the support means comprises at least one support rod 14 which extends through apertures 15 in captive edge portions 16 of each of the blades 12. The rod 14 will preferably be a one-half inch diameter rod. The apertures 15 are aligned to form a passage from one side of the module to an opposite side, so that the rod 14 may traverse the entire module 10. The captive edges 16 of the blades 12 are perpendicular to the rod 14.

A pllurality of resilient tubular spacers 18 are fitted over the rod 14 between the blades 12. The resilient spacers 18 are preferably composed of an elastomeric material such as neoprene rubber.

A holding means is supplied to hold the blades 12, rod 14 and spacers 18 together. Preferably the holding means comprises threaded nuts 17 fastened onto threaded ends of the rod 14 to hold the blade module 10 together.

Figure 6:
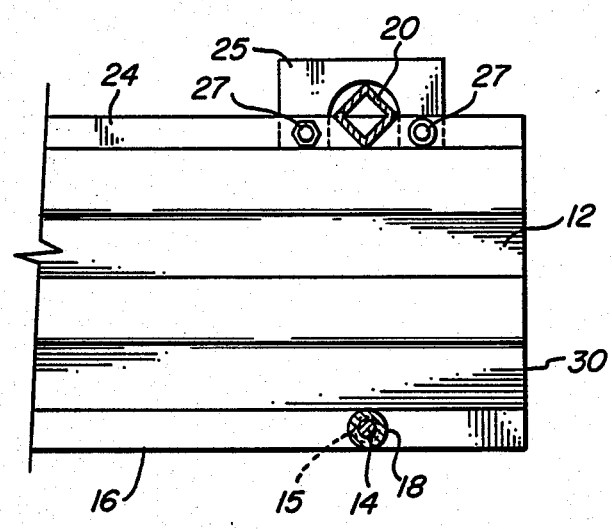
FIG. 6 is a cross section of the free edge portions of a mist eliminator module of the present invention along the line 6—6 of FIG. 1.

The second support element is a detachable spacer means for holding a free edge portion 24 of the blades 12 in spaced alignment. Preferably, the spacer means comprises at least one rigid hollow spacer bar 20 having slots 22 cut in one face. The free edge portions 24 of the blades 12 fit into the slots 22, which hold the free edges 24 in the selected spacing. The spacer bar 20 may have a variety of cross-sectional shapes, although a diamond shape, shown in FIG. 6, is the preferred embodiment.

The spacer bar 20 is secured to the blades 12 by a hold-down plate 25 which is fastened to the blades 12 by screws and nuts 27.

In the preferred embodiment, the captive edge portion 16 and the free edge portion 24 are flat portions of a blade 12 which are located in the path of gas flow shown by arrow A. The captive edge portion 16 thus presents a straight edge through which the rod 14 may be perpendicularly located. The free edge portion 24 presents a straight edge onto which the spacer bar 20 may be mounted. it should be noted that the rod 14 and spacer bar 20 are thus generally located in the gas flow path shown by arrow A. This selection of straight edges as the captive and free edge portions minimizes the costs and ease of production and assures flexibility in the mist eliminator module.

Figure 2:
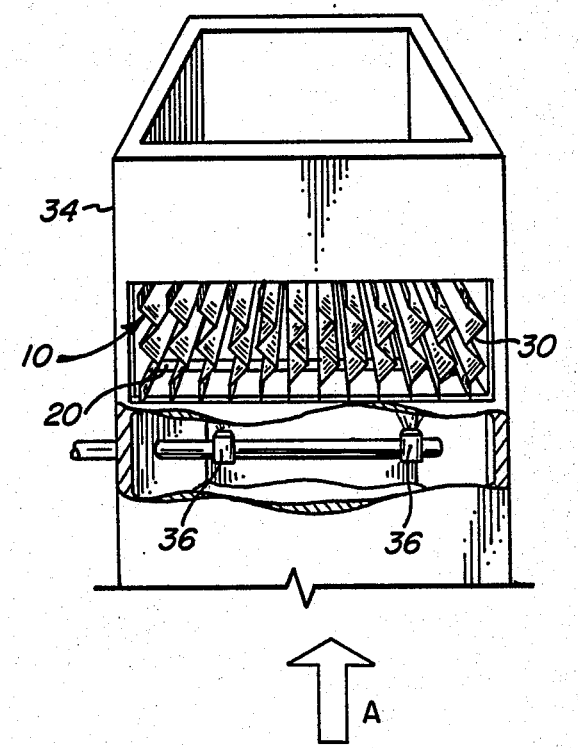
FIG. 2 is a cut-away view of a mist eliminator tower showing a mist eliminator module and a water spray.
Figure 4:
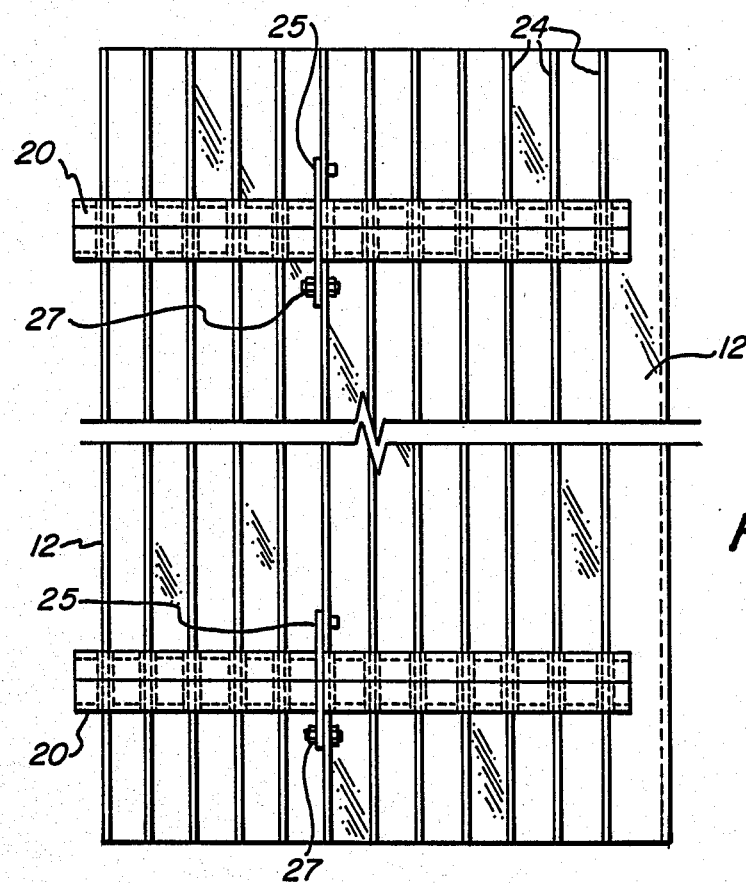
FIG. 4 a view showing at least one spacer bar mounted on the blades of the mist eliminator module.
Figure 5:
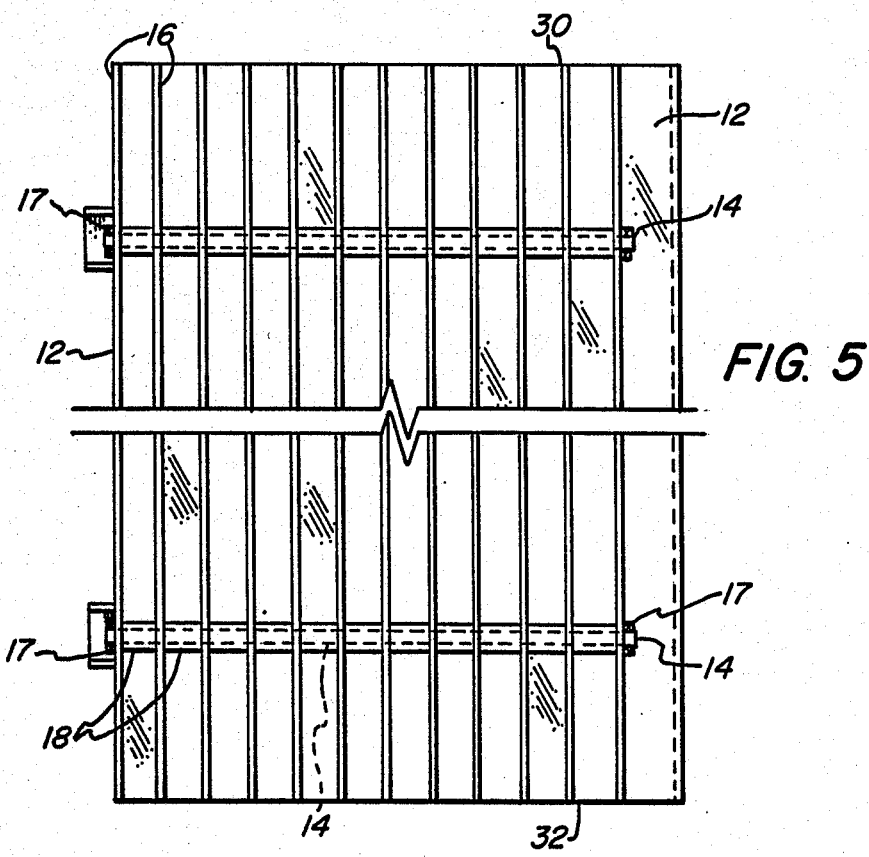
FIG. 5 is a view showing at least one rod extending through the captive edge portions of the blades of the mist eliminator module.

However, an alternative embodiment may be employed in which the captive edge portion is located at one edge of each blade in the zig-zag portion of the blade, shown as 30 in FIGS. 1, 2 and 5. A free edge portion would then be located on the opposite zig-zag edge, as shown at 32 in FIG. 5. This embodiment presents an equally effective mist eliminator module as the previously described preferred embodiment. However, this embodiment will generally be more costly to manufacture, due to the need to locate holes for the rod 14 in the bends or zig-zag portions of the blades, and the need to cut V-shaped or angled slots in the spacer bar 20.

Figure 3:
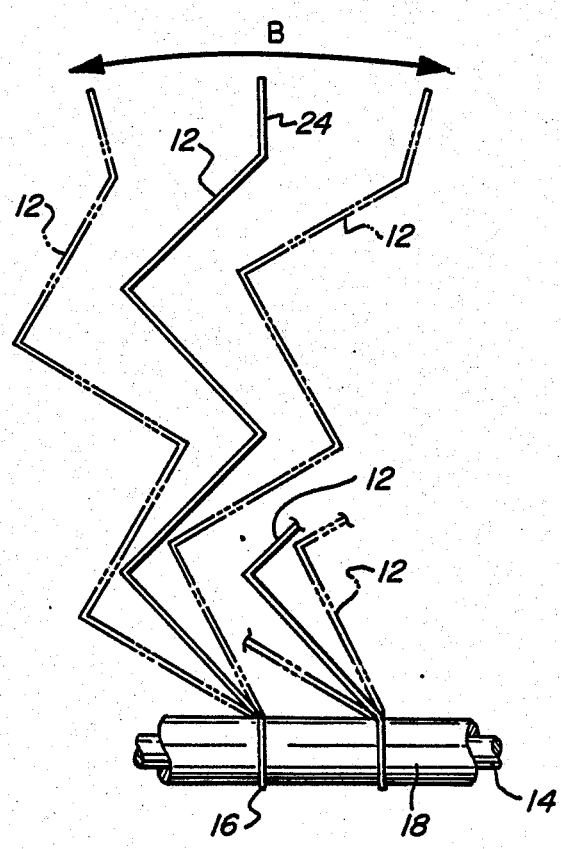
FIG. 3 is a detail end view of the rod and tubular flexible spacers showing blade movement when the rigid spacer is removed.

The design of the module 10 allows for easy accessibility to and cleaning of the blades 12 by removing the spacer bar 20, and cleaning by mechanical scrubbing or scraping each blade 12. The blades 12 are held in alignment by the rod 14 and spacers 18, but can be easily separated like the pages of a book. The ease of separation is due to the use of the resilient spacers 18 covering the rod 14. Some side to side movement of the blades may also be the result of the flexibility of the blade itself. The resilient spacers 18 serve to hold the blades 12 in their proper spacing during use, but, also allow the blades to be separated for cleaning. The present invention allows access to each side of the blade, as shown by the range of movement for each blade 12 indicated by Arrow B in FIG. 3.

The mist eliminator module 10 may be circular or rectangular, depending on the cross-sectional shape of the mist eliminator chamber; for instance, the mist eliminator tower 34 shown in FIG. 2 has a square cross-section.

The mist eliminator module 10 may be used in both horizontal flow gas streams and vertical flow gas streams without the clogging or reentrainment problems of prior art devices. In either case, the preferred embodiment of the module 10 will be located so that the supporting elements are located at the inlet and outlet ends of the module. In a horizontal flow gas stream the module 10 will be oriented such that the at least one support rod 14 and the at least one spacer bar 20 are located at opposite sides of the module 10. In a vertical flow gas stream the module 10 will be oriented such that the at least one support rod 14 and the at least one spacer bar 20 are located at the top and bottom of the module 10.

The module 10 is effective in either of two orientations relative to both a horizontal and a vertical gas stream. The module 10 may be mounted with the rod 14 penetrating the inlet edges of the blades 12 (that is, the upstream edges) and with the support bar 20 positioned on the outlet edges (the downstream edges) of the blades 12. This orientation is shown in FIG. 1 where the module is oriented relative to the direction of gas flow shown by Arrow A with the rod 14 penetrating the upstream edge. Alternatively, the support bar 20 may be located in front of the leading edges of the blades 12, with the rod 14 penetrating the trailing edges of the blades 12. The choice of orientations allows for in-place cleaning of the module 10 from either end of the module 10. In a vertical flow tower, the module may be cleaned either from above or below the module, depending on which orientation is selected. In a horizontal flow casing, the module may be cleaned from either side of the module, depending on which orientation is chosen. The choice of module orientation may be made depending on the size and location of access to the module inside the mist eliminator chamber.

In either orientation the module can be easily placed into operation after cleaning. In one vertical orientation where rod 14 penetrates the leading edges of the blades 12, the spacers 18 keep the blades 12 upright so that the blade free edges 24 may be fitted into the slots 22 of the spacer bar 20 without aligning the blades 12 with a comb or other devices. In the alternate vertical orientation, the blades 12 hang freely from the rod 14, allowing the spacer bar 20 to be quickly attached without aligning the blades 12 with a comb.

The frequency of manual cleaning can be reduced by providing a constant or intermittent spray of water over the mist eliminator blades to coat the blades 12 wih a film of water as shown in FIG. 2. The water film rinses off any accumulating solids from the blades, to insure the continuing droplet removal efficiency of the blades. It has been found that water spray nozzles 36 providing water drolets having a diameter of 200 to 300 microns at a nozzle pressure of at least 40 psig with water flow rates of between 0.1 to 0.5 gallons per minute per square foot of tower cross-sectional area provide optimal cleaning. The water spray nozzles 36 should be directed at the modules 10 from the upstream side of the leading edges of the blades 12.

It has been found that the module of the present invention may be made to be self cleaning by removing the spacer bar 20 from the module and operating the mist eliminator chamber to provide an air flow through the module sufficient to cause the blades to flex and vibrate. The flexing and vibration results because of the flexibility of the plastic blades 12 in combination with the resilient spacers 18. This unique combination gives the module 10 the capacity to the flex and vibrate, causing accumulated solids to flake off of the blade surfaces. Preferably, a water spray is also provided as above described to rinse off the flaking solids and to flex and vibrate the blades.

Therefore, the present invention provides an improved mist eliminator blade module, which is easily cleaned, and which can be made to be self-cleaning in place.

What is claimed is:

1. A mist eliminator module for removing liquid components of a gas stream, comprising:
   a plurality of mist eliminator blades formed from a smooth material, each blade having a captive edge portion and a free edge portion, and each blade being in substantial alignment with adjacent blades;
   support means for resiliently holding said captive edge portion of said blades in spaced alignment; and
   detachable spacer means for holding said free edge portion of said blades in spaced alignment;
   whereby each blades may be readily separated from adjacent blades after detaching said spacer means.

2. A mist eliminator module in accordance with claim 1 wherein said support means comprises:
   at least one support rod extending through aligned apertures in the captive edge portions of said blades;
   a plurality of resilient spacers fitted onto said rod between said blades; and
   means for holding the said blades and spacers in secured alignment.

3. A mist eliminator module in accordance with claim 2 wherein each end of said at least one support rod is threaded and wherein said holding means comprises threaded nuts threaded onto said support rod ends.

4. A mist eliminator module in accordance with claim 1 wherein said spacer means comprises at least one spacer bar having a plurality of slots formed in one edge for receiving said free edge portions of said blades.

5. A mist eliminator module in accordance with claim 4 wherein said module is oriented relative to said gas stream such that said support rod and said captive edge portions of said blades are located downstream of said spacer bar and said free edge portions of said blades.

6. A mist eliminator module in accordance with claim 4 wherein said module is oriented relative to said gas stream such that said support rod and said captive edge portions of said blades are located upstream of said spacer bar and said free end portions of said blades.

7. A mist eliminator module in accordance with claim 2 wherein said resilient spacers comprise an elastomeric material.

8. A mist eliminator module in accordance with claim 7 wherein said resilient spacers comprise neoprene rubber.

9. A mist eliminator module in accordance with claim 4 wherein said mist eliminator blades comprise a polymeric material.

10. A mist eliminator module in accordance with claim 9 wherein said mist eliminator blades comprise a fiber reinforced polyester material.

11. A mist eliminator module in accordance with claim 1, further comprising at least one water spray nozzle located upstream of said module, whereby a spray of water droplets having a diameter of 200 to 300 microns is directed onto said blades.

12. A mist eliminator module for removing the liquid components of a gas stream, comprising:
   a plurality of smooth mist eliminator blades formed from a polymeric material, each blade having a captive edge portion and a free edge portion, and each blade being in substantial alignment with adjacent blades;
   support means for holding said captive edge portions, said support means having a plurality of resilient spacers separating said blades and being secured thereto; and
   detachable spacer means for holding said free edge portions in spaced alignment in slots formed in said spacer means for receiving said free edge portions;
   whereby each blade may be readily separated from adjacent blades after detaching said spacer means.

13. A mist eliminator module in accordance with claim 12 wherein said support means comprises at least one support rod having threaded ends extending through aligned apertures in said captive edge portions of said blades and wherein said resilient spacers are fitted onto said rod between said captive edge portions and wherein threaded nuts are threaded onto said threaded rod ends.

14. A mist eliminator module in accordance with claim 12 wherein said spacer means comprises a hollow bar.

15. A mist eliminator module for removing liquid components of a gas stream, comprising:
   a plurality of parallel mist eliminator blades formed from a fiber reinforced polyester material, each blade having in one edge thereof at least one aperture aligned with apertures in adjacent blades;
   at least one support rod extending through said aligned apertures, said at least one rod having a plurality of resilient tubular spacers fitted onto said rod between said blades; and
   at least one spacer bar having a plurality of slots in one face thereof into which are inserted the edges of said blades opposite the said edges having apertures therein.

16. A mist eliminator module in accordance with claim 15 wherein said module is oriented relative to said gas stream such that said apertures are provided in the upstream edges of said blades, and the downstream edges of said blades are inserted into said slots in said spacer bar.

17. A mist eliminator module in accordance with claim 15 wherein said module is oriented relative to said gas stream such that apertures are provided in the downstream edges of said blades, and the upstream edges of said blades are inserted into said slots in said spacer bar.

18. A mist eliminator module in accordance with claim 15, further comprising:
   means for spraying water on said blades to form a water film on said blades.

19. A mist eliminator assembly in accordance with claim 18 wherein said water spray means provides a spray of water droplets having a diameter of 200 to 300 microns at a nozzle pressure of 40 psig from an upstream side of said mist eliminator.

20. A self-cleaning mist eliminator assembly, comprising:
   a plurality of smooth mist eliminator blades formed from a polymeric material, each blade having a captive edge portion and a free edge portion, and having in said captive edge portion a plurality of apertures aligned with apertures in adjacent blades;
   at least one support rod extending through said aligned apertures, each said rod having a plurality of elastomeric spacers fitted onto said rod between said blades;
   at least one rigid spacer bar, each said bar having a plurality of slots formed in one face into which are fitted said free edge portion of said blades, and each said spacer bar being secured to at least one said blade; and
   a spray nozzle and water supply providing a spray of water droplets having a diameter of 200 to 300 microns directed to form a water film on said blades.

21. A method of self-cleaning deposited solids from the blades of a mist eliminator module having a plurality of mist eliminator blades formed from a smooth material, said module having support means for resiliently holding captive edge portions of said blades in spaced alignment, and detachable spacer means for holding free edge portions of said blades in alignment, and a spray nozzle and water supply providing a spray of water, wherein said module and spray nozzle are mounted inside a mist eliminator chamber, comprising the steps of:
   removing said detachable support means from said module;
   directing a spray of water droplets having a diameter of 200 to 300 microns at a pressure of at least 40 psig on said blades; and
   flowing air at an effective volume and velocity through said mist eliminator chamber to induce flexing and vibration of said blades sufficient to dislodge said deposited solids.

22. A method of self-cleaning deposited solids from the blades of a mist eliminator module having a plurality of mist eliminator blades formed from a polymeric material, each blade having a plurality of aligned apertures in one captive edge portion thereof, and at least one support rod extending through said apertures, each said rod having a plurality of resilient tubular spacers fitted onto said rod between said blades, and said module having at least one rigid spacer bar having a plurality of slots in one face into which are fitted the free edge portions of said blades, and a spray nozzle and water supply providing a spray of water, wherein said module and spray nozzle are mounted inside a mist eliminator chamber, comprising the steps of:
   removing said rigid spacer bar from the said free end portions of said blades,
   directing a spray of water droplets having a diameter of 200 to 300 microns at a pressure of at least 40 psig on said blades; and
   flowing air at an effective volume and velocity through said mist eliminator chamber to induce flexing and vibration of said blades sufficient to dislodge said deposited solids.

* * * * *